United States Patent [19]
Kyker et al.

[11] 3,943,088
[45] Mar. 9, 1976

[54] POLY(FLUOROALKOXYPHOSPHAZENES)

[75] Inventors: Gary Stephen Kyker, Uniontown; Thomas Anthony Antkowiak, Rittman, both of Ohio

[73] Assignee: The Firestone Tire & Rubber Company, Akron, Ohio

[22] Filed: Jan. 25, 1974

[21] Appl. No.: 436,566

[52] U.S. Cl............................ 260/30.6 R; 260/2 P
[51] Int. Cl.² ................... C08K 5/51; C08L 85/02
[58] Field of Search ............ 260/30.6 R, 927 N, 2 P

[56] References Cited
UNITED STATES PATENTS

| | | | |
|---|---|---|---|
| 3,271,330 | 9/1966 | Evans | 260/2 P |
| 3,304,350 | 2/1967 | Kober et al. | 260/927 N |
| 3,515,688 | 6/1970 | Rose | 260/2 P |

OTHER PUBLICATIONS

Allcock, *C & EN*, Apr. 22, 1968, pp. 68–81 (note particularly p. 80).

*Primary Examiner*—Allan Lieberman

[57] ABSTRACT

The physical properties of poly(fluoroalkoxyphosphazene) materials are improved by the addition of fluoroalkoxyphosphazene oils to said materials.

6 Claims, No Drawings

POLY(FLUOROALKOXYPHOSPHAZENES)

This invention relates to the improvement of the physical properties of poly(fluoroalkoxyphosphazene) vulcanizates and reinforced vulcanizates of polymers such as those described in Evans U.S. Pat. No. 3,271,330; Allcock U.S. Pat. No. 3,370,026 and in Rose U.S. Pat. No. 3,515,688. More particularly, it relates to the addition of low molecular weight phosphonitrilic fluoroalkoxide oils (oligomers or cyclic) to poly(fluoroalkoxyphosphazenes) and to the resulting products.

In processing poly(fluoroalkoxyphosphazenes) of the types described in the above noted patents, for example when working them on a rubber mill, it is found that they tend to stick to the rolls. Furthermore, such materials when reinforced with silica, carbon black, or other fillers exhibit relatively low elongations as cured. This appears to be particularly significant for polyphosphazenes in which the pendant fluoroalkoxide groups are of chain lengths which do not differ substantially.

It has now been found that the elongations of such poly(fluoroalkoxyphosphazenes) are dramatically improved by the addition of relatively low molecular weight phosphonitrilic fluoroalkoxide oligomers and that the improved elongations are obtained with only a small decrease in the tensile strength and with essentially no loss in the thermal stability (300°F) of the materials.

Poly(fluoroalkoxyphosphazene) stocks containing silica or carbon black reinforcing agents, metal oxide and conventional curing agents are also difficult to process on rubber mills or calenders due to severe sticking to the rolls. These materials are also difficult to extrude. Furthermore, the vulcanized stocks of such elastomers, as $[(CF_3CH_2O)(CF_3CF_2CF_2CH_2O)P=N]_n$ often exhibit relatively low elongations, e.g. 30% to 120%.

The addition of low molecular weight phosphonitrilic fluoroalkoxides (oligomers or cyclics) to these stocks has been found to improve their processibility, stress/strain properties and low temperature flexibility. These "oils" may be added to the stock during mixing with conventional equipment, such as rubber mill, Brabender Mixer, or Banbury Mixer or by solution compounding with the elastomer prior to such conventional mechanical compounding. Furthermore, the level of the addition of oil may be varied by including some unpolymerized phosphonitrilic chloride oligomers with the poly(dichlorophosphazene) from which the poly(fluoroalkoxyphosphazenes) are prepared by displacement of the chlorine atoms with fluoroalkoxy groups along the —P=N— chain.

Briefly, then, the present invention comprises the use of low molecular weight oligomers or cyclic compounds represented by the following general formula $[(R_FO)R'_FO)P=N]_n$ wherein n represents an integer from 3 to 100 and is preferably not greater than 12 and $R_F$ and $R'_F$ each represents a monovalent radical represented by the formula $—(CH_2)_m(CF_2)_qCF_2Z$, Z representing F or H; $m$ being an integer from 1 to 10 (1 being preferred) and $q$ being an integer from 1 to 20, the relatively low molecular weight materials being oily liquids at room temperature and being incorporated in the poly(fluoroalkoxyphosphazene) in much the same manner as oil extenders are conventionally added to hydrocarbon rubber stocks. For the formula given it will be seen that for $n=12$ (line 21) the oily liquids will have a molecular weight up to about $4 \times 10^3$ or higher.

The low molecular weight phosphazenes may be either straight chain, branched chain or cyclic compounds in which the groups attached to the P atoms are any of the following:

alkoxide
substituted alkoxide, particularly fluoroalkoxides
unsaturated alkoxide
aryloxide
substituted aryloxide
amines The following data are illustrative of the practice of this invention and are not intended to limit the same.

In Tables I through V which follow, data is presented which illustrates the effect of the addition of low molecular weight fluoroalkoxyphosphazenes to stock consisting of higher molecular weight poly(fluoroalkoxyphosphazenes) and various fillers and other additives.

Elastomag 170 and Stan Mag ELC may be considered to be MgO.

Aerosil 200, Aerosil 300 and Silanox are trade names for treated fumed silica, and are silica fillers.

Dicup 40C is a trade name for dicumyl peroxide.

FEF and SAF are carbon black.

Table I

EFFECT OF ADDING LOW MOLECULAR WEIGHT PHOSPHAZENES ON TENSILE-ELONGATION OF "LOW-ELONGATION POLYMER" $[(CF_3CH_2O)(CF_3CF_2CF_2CH_2O)P=N]_n$

| Compound | C | D | A | B |
|---|---|---|---|---|
| Polymer | 100.0 | 100.0 | 100.0 | 120.0 |
| Low Molecular Weight Oil | 10.0 | 20.0 | | |

Normal Stress/Strain - 300°F cure; no post cure.

| 100% Modulus (psi) | | | | |
|---|---|---|---|---|
| 30 minutes | 265 | 65 | | |
| 60 minutes | 530 | 80 | | |
| 90 minutes | 330 | 80 | | |

| 200% Modulus (psi) | | | | |
|---|---|---|---|---|
| 30 minutes | | 195 | | |
| 60 minutes | | 240 | | |
| 90 minutes | | 235 | | |

| Tensile (psi) | | | | |
|---|---|---|---|---|
| 30 minutes | 670 | 835 | 680 | 610 |
| 60 minutes | 645 | 840 | 710 | 610 |

Table I-continued

EFFECT OF ADDING LOW MOLECULAR WEIGHT PHOSPHAZENES ON TENSILE-ELONGATION OF "LOW-ELONGATION POLYMER" $[(CF_3CH_2O)(CF_3CF_2CF_2CH_2O)P=N]_n$

| Compound | C | D | A | B |
|---|---|---|---|---|
| 90 minutes | 760 | 825 | 850 | 585 |
| % Elongation | | | | |
| 30 minutes | 150 | 325 | 40 | 40 |
| 60 minutes | 120 | 330 | 40 | 35 |
| 90 minutes | 140 | 360 | 40 | 40 |
| Shore A Hardness | 50.5 | 43.5 | 64.0 | 55.0 |
| % Compression Set | 42.3 | 44.4 | 38.4 | 31.0 |

Table II

EFFECT OF ADDING LOW MOLECULAR WEIGHT PHOSPHAZENES ON TENSILE-ELONGATION

| | 384 | 387 |
|---|---|---|
| Polymer | 100.0 | 100.0 |
| Elastomag 170 | 6.0 | 6.0 |
| Aerosil 200 | 14.0 | 14.0 |
| Dicup 40C | 0.8 | 0.8 |
| Low Molecular Weight Oil | — | 12.0 |

Normal Stress/Strain - 280°F cure; 24 hours/212°F post cure.

100% Modulus (psi)

| | 384 | 387 |
|---|---|---|
| 20 minutes | — | 280 |
| 60 minutes | — | 320 |
| 90 minutes | — | 350 |
| 200% Modulus (psi) | | |
| 30 minutes | — | 1020 |
| 60 minutes | — | — |
| 90 minutes | — | — |
| Tensile (psi) | | |
| 30 minutes | 835 | 1155 |
| 60 minutes | 1000 | 1035 |
| 90 minutes | 950 | 1200 |
| % Elongation | | |
| 30 minutes | 65 | 215 |
| 60 minutes | 90 | 160 |
| 90 minutes | 80 | 180 |

Table III

THE EFFECT OF OIL EXTENSION ON MECHANICAL AND HEAT AGING PROPERTIES

| Compound | A | B | C | D |
|---|---|---|---|---|
| Polymer | 100 | 100 | 100 | 100 |
| Silanox 101 | 30 | 30 | 30 | 30 |
| Stan Mag ELC | 6 | 6 | 6 | 6 |
| $C_2^F C_5^F(T)$ Oils | — | 5 | 10 | 15 |
| Dicup 40C | 2 | 2 | 2 | 2 |

Stress/Strain
Cure 30 min. at 212°F
Post Cure 24 hrs. at 212°F

| | A | B | C | D |
|---|---|---|---|---|
| 100% Modulus (psi) | | | | |
| Original | 1275 | 1125 | 963 | 800 |
| 240 Hrs. at 300°F | 853 | 935 | 666 | 801 |
| 336 Hrs. at 300°F | 774 | 697 | 740 | 585 |
| 240 Hrs. at 350°F | 439 | 520 | 460 | 540 |
| Tensile Strength (psi) | | | | |
| Original | 1615 | 1350 | 1225 | 1262 |
| 240 Hrs. at 300°F | 1282 | 1351 | 1211 | 1189 |
| 336 Hrs. at 300°F | 1150 | 1520 | 1250 | 1200 |
| 240 Hrs. at 350°F | 754 | 790 | 739 | 683 |
| % Elongation (at Break) | | | | |
| Original | 107 | 115 | 115 | 125 |
| 240 Hrs. at 300°F | 140 | 135 | 155 | 140 |
| 336 Hrs. at 300°F | 135 | 157 | 142 | 160 |
| 240 Hrs. at 350°F | 165 | 130 | 145 | 135 |
| Shore A Hardness | | | | |
| Original | 68 | 68 | 62 | 61 |
| 336 Hrs. at 300°F | 71 | 69 | 68 | 68 |
| ASTM % Compression Set | | | | |
| 70 Hrs. at 300°F | 74 | 68 | 65 | 64 |

Table IV

**IMPROVED LOW TEMPERATURE FLEXIBILITY OF $[(CF_3CH_2O)(CHF_2(CF_2)_3CH_2O)(X)P=N]_n$* STOCKS BY THE USE OF LOW MOLECULAR WEIGHT OILS**

| Compound | A | B | C | D | E | F |
|---|---|---|---|---|---|---|
| Polymer | 100 | 100 | 100 | 100 | 100 | 100 |
| Aerosil 300 | 14 | 14 | — | — | — | — |
| FEF Carbon Black | — | — | 10 | 10 | — | — |

Table IV-continued
IMPROVED LOW TEMPERATURE FLEXIBILITY OF [(CF₃CH₂O)(CHF₂(CF₂)₃CH₂O)(X)P=N]ₙ* STOCKS BY THE USE OF LOW MOLECULAR WEIGHT OILS

| Compound | A | B | C | D | E | F |
|---|---|---|---|---|---|---|
| SAF Carbon Black | | | | | 10 | 10 |
| Stan Mag ELC | 6 | 6 | 6 | 6 | 6 | 6 |
| Low Molecular Weight Oils | — | 20 | — | 20 | — | 20 |
| Dicup 40C | 1 | 1 | 1 | 1 | 1 | 1 |
| Normal Stress/Strain | | | | | | |
| Cure 30 Hrs. at 320°F | | | | | | |
| Post Cure 24 Hrs. at 212°F | | | | | | |
| 100% Modulus (psi) | 257 | 242 | 146 | 103 | 67 | 76 |
| Tensile Strength (psi) | 523 | 861 | 815 | 443 | 944 | 678 |
| % Elongation (at Break) | 170 | 180 | 185 | 240 | 365 | 275 |
| Shore A Hardness | 63 | 54 | 25 | 19 | 29 | 22 |
| Gehman Flexure | | | | | | |
| (ASTM D-1053) | | | | | | |
| T 5 (°C) | −52 | −58 | −57 | −59 | −45 | −59 |
| T 10 (°C) | −54 | −60 | −52 | −60 | −49 | −61 |
| T 100 (°C) | −63 | −67 | −61 | −66 | −61 | −68 |
| Freeze Point (°C) | −64 | −67 | −66 | −69 | −67 | −71 |
| Temperature (°C) at Which Young's Modulus in Flexure is 10,000 psi | — | −64 | — | −66 | — | −64 |
| (ASTM D-797) | | | | | | |

*Wherein X is an o-allylphenoxy group

Table V
THE EFFECT OF OIL EXTENSION OF [(CF₃CH₂O)(HF₂(CF₂)₃CH₂O)(X)P=N]ₙ* STOCK ON LOW TEMPERATURE FLEXIBILITY

| Compound | A | B | C |
|---|---|---|---|
| Polymer | 100 | 100 | 100 |
| Silanox 101 | 30 | 30 | 30 |
| Stan Mag ELC | 6 | 6 | 6 |
| Low Molecular Weight Oils | 5 | 10 | 15 |
| Dicup 40C | 2 | 2 | 2 |
| Normal Stress/Strain | | | |
| Cure 30 Hrs. at 320°F | | | |
| Post Cure 24 Hrs. at 212°F | | | |
| 50% Modulus (psi) | 287 | 212 | 187 |
| 100% Modulus (psi) | 1125 | 963 | 800 |
| Tensile Strength (psi) | 1350 | 1225 | 1262 |
| % Elongation | 115 | 115 | 125 |
| % Tension Set | 7 | 6 | 6 |
| Shore A Hardness | 68 | 62 | 60 |
| Young's Modulus in Flexure | | | |
| (ASTM D-797) | | | |
| 0 °C | 2080 | 1892 | 1893 |
| −20 | 3833 | 2663 | 2396 |
| −30 | 4620 | 3677 | 2920 |
| −40 | 6930 | 4680 | 4122 |
| −50 | 13416 | 9534 | 7302 |
| −60 | 27600 | 20976 | 15196 |
| −67 | 94876 | 87131 | 74971 |
| Temperature (°C) at Which Young's Modulus in Flexure is 10,000 psi | −46 | −51 | −56 |
| Gehman Flexure | | | |
| (ASTM D-1053) | | | |
| Twist Angle | | | |
| Room Temperature | 173 | 172 | 174 |
| −30 °C | 144 | 154 | 153 |
| −35 | 120 | 141 | 141 |
| −40 | 89 | 119 | 121 |
| −45 | 60 | 65 | 87 |
| −50 | 31 | 44 | 64 |
| −55 | 23 | 29 | 45 |
| −60 | 8 | 9 | 15 |
| −65 | 4 | 5 | 6 |
| −70 | 4 | 5 | 5 |
| −80 | 3 | 3 | 3 |
| T 5 (°C) | −31 | −34 | −30 |
| T 10 (°C) | −34 | −38 | −37 |
| T 100 (°C) | −49 | −53 | −56 |
| Freeze Point (°C) | −55 | −58 | −64 |
| G' (psi) | 120 | 139 | 100 |

*Wherein X is an o-allylphenoxy group

Table I sets forth the effect on the physical properties produced by the addition of 0, 10 and 20 parts by weight of a mixture of low molecular weight fluoroalkoxyphosphazenes to either 100 or 120 parts by weight of polymer stock consisting of poly(fluoroalkoxyphosphazene) represented by the formula

in which Q and Q' each represents randomly distributed —OCH₂CF₃ and —OCH₂CF₂CF₂CF₃ groups, and to which polymer there had been added 6.0 parts by weight of MgO (Elastomag 170), 14.2 parts by weight of silica (Aerosil 200) and 7.5 parts by weight of dicumyl peroxide (Dicup 40C) as a curing agent. The low molecular weight oil consisted of [(CF₃CH₂O)(F₃C(CF₂)₂CH₂O)P=N]ₙ.

Table II shows the results obtained with a high molecuar weight polyphosphazene which consisted of randomly distributed —OCH₂CF₃ and —OCH₂CF₂CF₂CF₂CF₂H pendant groups randomly attached to the P atoms of the —P=N— chain, the low molecular weight oil being a fluid of similar composition.

Table III illustrates the effect of low molecular weight phosphazenes on heat-aging properties of a stock based on the same polymer as that used in Table II.

Table IV presents further data showing the low temperature flexibility of a polyphosphazene stock based on a polymer having randomly distributed —OCH₂CF₃; —OCH₂(CF₂)₃CF₂H; and o-allylphenoxy groups; in a somewhat different composition stock, and the improvement resulting from the addition of various amounts of low molecular weight oils.

Table V presents similar data for a modified stock formulation, utilizing the same high molecular weight polyphosphazene as that in Table IV.

The present invention is particularly suited to the improvement of poly(fluoroalkoxidepolyphosphazenes) having molecular weights of between $3 \times 10^4$ and $3 \times 10^6$, i.e. polymers represented by the formula

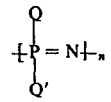

wherein Q and Q' are any of F(CF₂)ₘCH₂O— and H(CF₂)ₘCH₂O—, m being not greater than 9 as defined in the above noted U.S. Pat. No. 3,515,688 issued June 2, 1970 wherein n is between $10^3$ and $10^4$, and stocks compounded from such polyphosphazenes and various kinds of fillers.

Having now described preferred embodiments of the invention in accordance with the Patent Statutes, it is not intended that it be limited except as may be required by the appended claims.

We claim:

1. A composition comprising at least one poly(fluoroalkoxyphosphazene) polymer having a molecular weight between about $3 \times 10^4$ and $3 \times 10^6$ and at least one lower molecular weight polyphosphazene oil having a molecular weight up to about $4 \times 10^3$ and represented by the formula

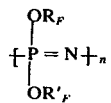

in which $n$ represents an integer from 3 to 100 and $R_F$ and $R'_F$ each represent a monovalent radical represented by the formula $-(CH_2)_m(CF_2)_qCF_2Z$, in which $m$ is an integer of from 1 to 10, and $q$ is an integer from 1 to 20, and Z is selected from the group consisting of F and H, the amount of said oil being between 2 and 50 parts by weight per hundred parts by weight of said polymer.

2. The composition of claim 1 wherein both the polymer and the oil are fluoroalkoxyphosphazenes.

3. The composition of claim 1 including at least one filler.

4. The composition of claim 1 including at least one curing agent.

5. The composition of claim 4 wherein the curing agent is an organic peroxide.

6. The composition of claim 4 as a cured product.

* * * * *